United States Patent [19]

Ashford

[11] 4,130,733

[45] Dec. 19, 1978

[54] FREQUENCY CHANNEL UNITS FOR A FDM SYSTEM

[75] Inventor: Donald A. Ashford, Stamford, Conn.

[73] Assignee: International Telephone & Telegraph Corp., Nutley, N.J.

[21] Appl. No.: 758,107

[22] Filed: Jan. 10, 1977

[51] Int. Cl.² .............................................. H04J 1/06
[52] U.S. Cl. ................................................ 179/15 FD
[58] Field of Search ........... 179/15 FD, 15 FS, 2.5 R; 325/49, 50, 137, 138, 329, 330

[56] References Cited

U.S. PATENT DOCUMENTS

| 3,364,311 | 1/1968 | Webb | 179/15 FS |
| 3,809,815 | 5/1974 | Reed et al. | 179/15 FD |
| 4,024,350 | 5/1977 | Deman | 179/15 FS |

Primary Examiner—Kathleen H. Claffy
Assistant Examiner—Joseph A. Popek
Attorney, Agent, or Firm—John T. O'Halloran; Alfred C. Hill

[57] ABSTRACT

Each of the FDM frequency channel units of a FDM system include a physically programmable voltage controlled oscillator and a phase locked loop coupled therewith responsive to a reference signal or a physically programmable counter responsive to the reference signal. Each of these arrangements produce a carrier signal having a different predetermined frequency for each of a plurality of FDM frequency channel units. A balanced modulator modulates and transmits an associated one of the carrier signals with information and a balanced demodulator responsive to an associated one of the produced carrier signals demodulates an associated one of a plurality of received information bearing carrier signals.

21 Claims, 4 Drawing Figures

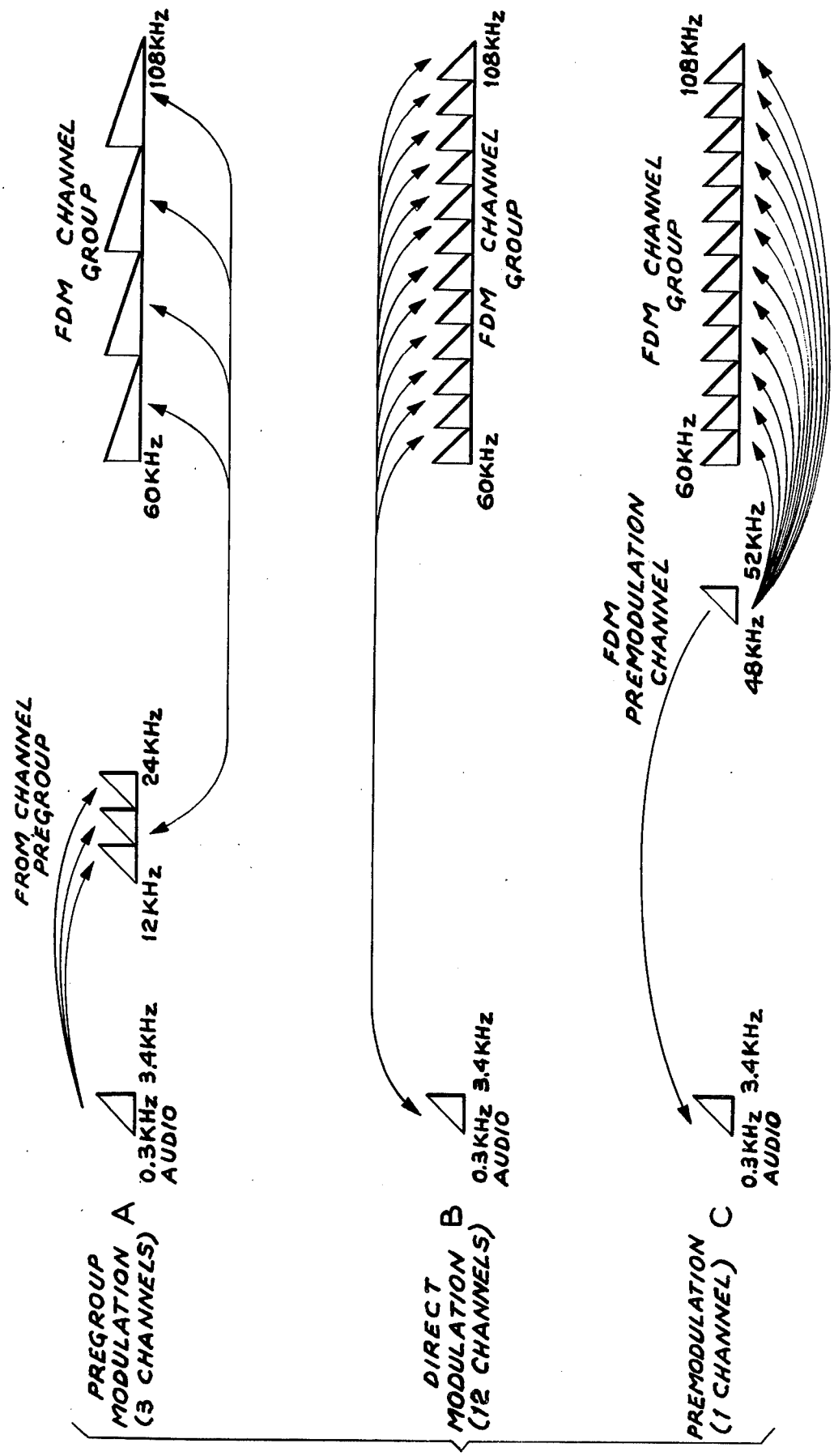

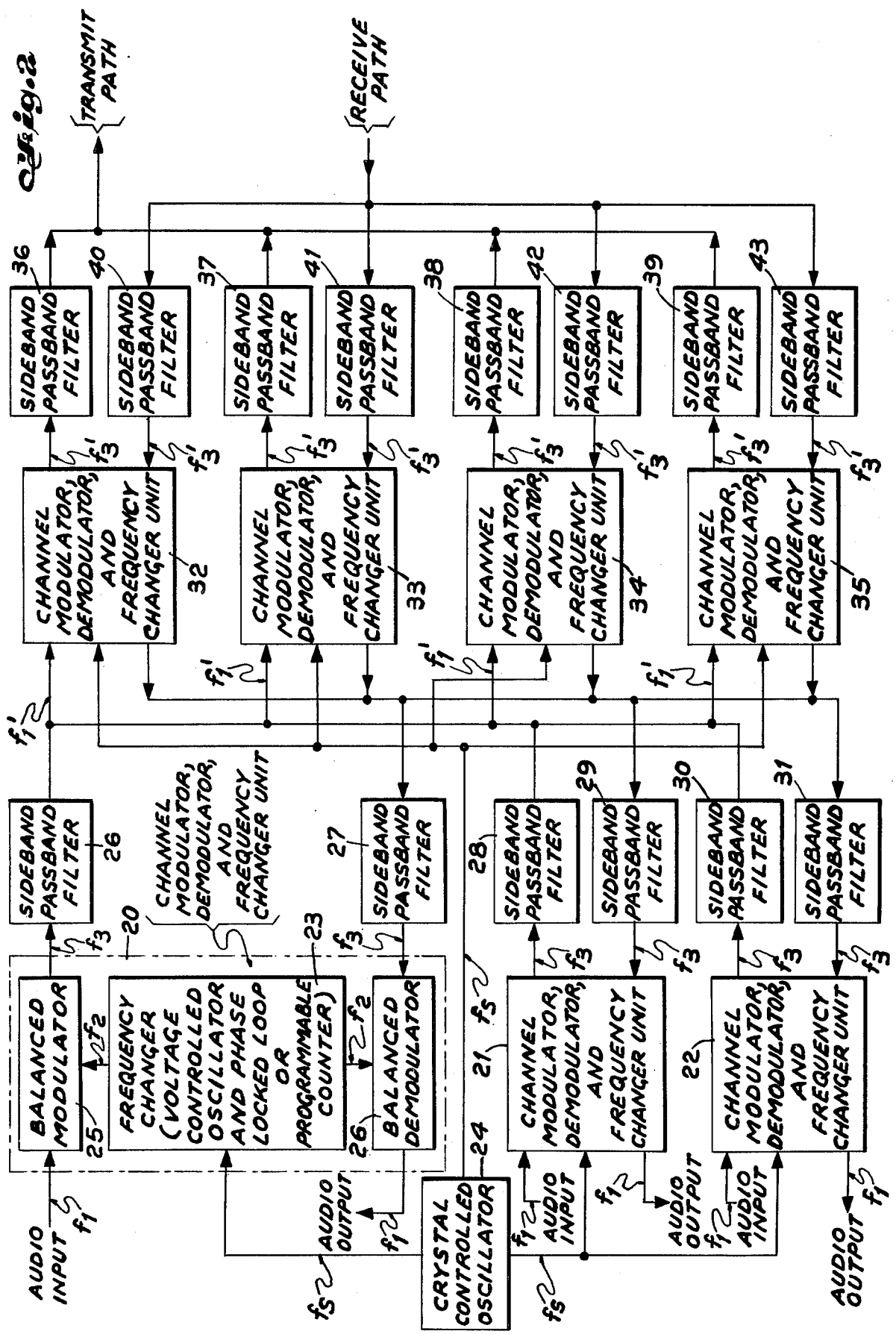

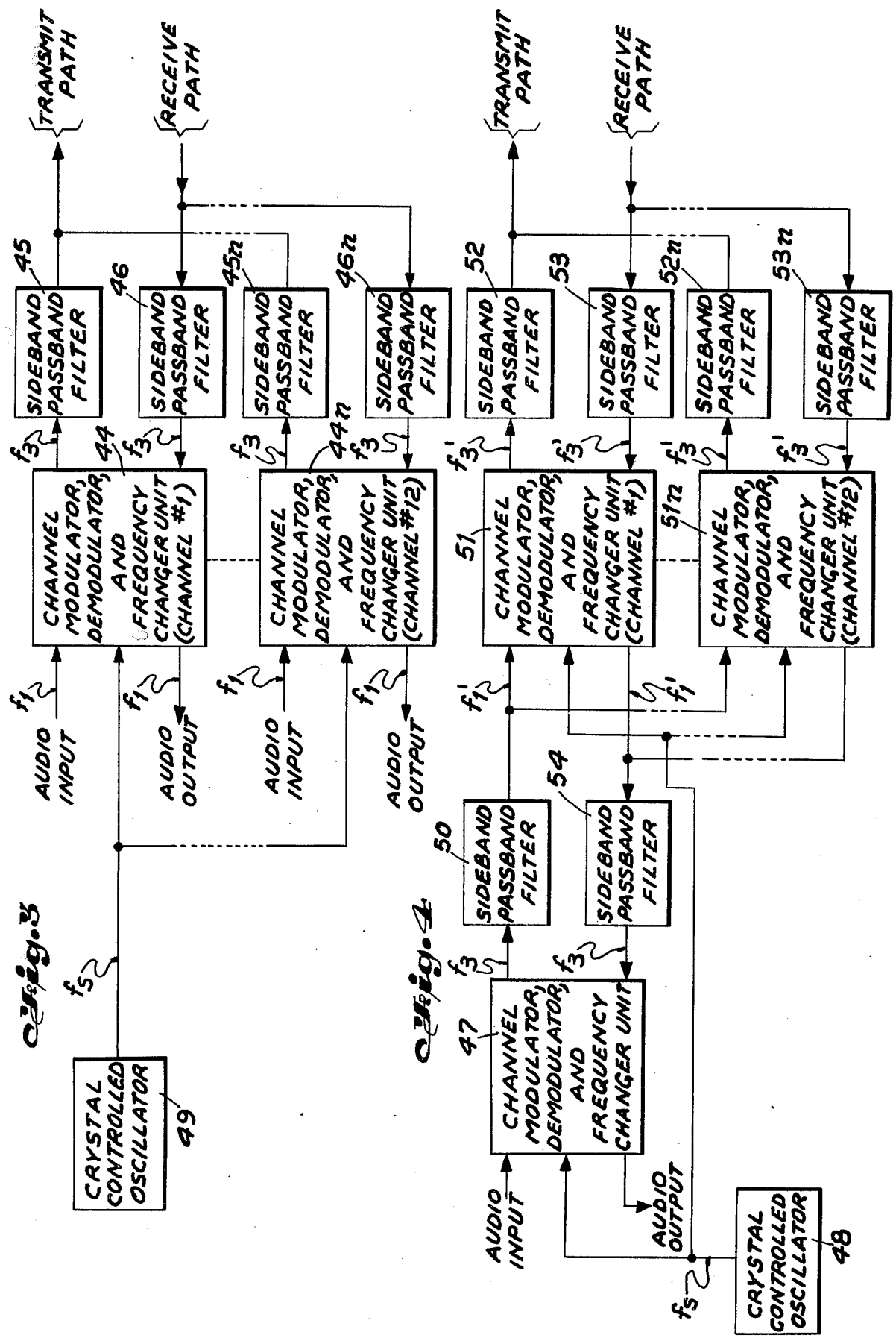

FREQUENCY CHANNEL UNITS FOR A FDM SYSTEM

BACKGROUND OF THE INVENTION

This invention relates to frequency division multiplex (FDM) systems and more particularly to FDM frequency channel units incorporated in such systems to generate a desired frequency channel group.

In present FDM systems, the channel modulators and demodulators form one subsystem and another separate subsystem is used to generate a plurality of carriers needed to make the modulators and demodulators operate in the appropriate frequency bands.

SUMMARY OF THE INVENTION

An object of the present invention is to provide a single subsystem incorporating the channel modulator and demodulator and a programmable frequency changer under control of a reference signal.

Another object of the present invention is to provide one subsystem incorporating channel modulators and demodulators and a frequency changer under control of a reference signal to provide the desired frequency channels at a very considerable cost reduction.

A feature of the present invention is the provision in a frequency division multiplex (FDM) system of a plurality of FDM frequency channel units each comprising: first means responsive to a reference signal having a predetermined first frequency to produce a carrier signal having a different predetermined second frequency for each of the units; and second means coupled to the first means to modulate and to transmit an associated one of the carrier signals with information.

Another feature of the present invention is the provision in a frequency division multiplex (FDM) system of a plurality of FDM frequency channel units each comprising: first means responsive to a reference signal having a predetermined first frequency to produce a carrier signal having a different predetermined second frequency for each of the units; and second means disposed in each of the units coupled to the first means responsive to an associated one of the carrier signals produced by the first means to demodulate an associated one of a plurality of received information bearing carrier signals.

BRIEF DESCRIPTION OF THE DRAWING

Above-mentioned and other features and objects of this invention will become more apparent by reference to the following description taken in conjunction with the accompanying drawing, in which:

FIG. 1 illustrates a set of curves of the principle modulation schemes employed for building up a FDM channel group;

FIG. 2 is a block diagram of the equipment in accordance with the principles of the present invention for performing the pregroup modulation scheme of Curve A, FIG. 1;

FIG. 3 is a block diagram of the equipment in accordance with the principles of the present invention for carrying out the direct modulation scheme of Curve B, FIG. 1; and FIG. 4 is a block diagram of the equipment in accordance with the principles of the present invention for performing the premodulation scheme of Curve C, FIG. 1.

DESCRIPTION OF THE PREFERRED EMBODIMENT

Referring to FIG. 2, the equipment in accordance with the principles of the present invention for carrying out the modulation scheme of Curve A, FIG. 1 is illustrated. The three FDM channel pregroups having the frequency range of 12 KHz (kilohertz) to 24 KHz is provided by the channel modulator, demodulator and frequency changer units 20–22. Each of the units 20–22 include therein in accordance with the principles of the present invention a single subsystem having a frequency changer 23 which may be a physically programmable voltage controlled oscillator controlled by a phase locked loop or a physically programmable counter, each of which is under control of a reference signal $f_s$ which has a frequency value of 4 KHz produced by crystal controlled oscillator 24. Each of the frequency changers in units 20–22 will be physically programmed by adjusting the operating frequency of the voltage controlled oscillator and pins of the programmable counter so as to produce different carrier frequencies $f_2$. The carrier frequency associated with unit 20 are coupled to a balanced modulator 25 and also to a balanced demodulator 26. The purpose of the balanced modulator 25 is to modulate the carrier $f_2$ with the audio input $f_1$ and produce as an output thereof $f_3$ which is passed through a sideband passband filter 26 to produce a single sideband signal for application to further equipment as will be described hereinbelow. The received FDM signal is passed through sideband passband filter 27 to produce a frequency $f_3$ for application to demodulator 26 to recover the audio output $f_1$. The units 21 and 22 are identical to unit 20, but each have a different carrier frequency $f_2$ than unit 20. Units 21 and 22 have associated therewith sideband passband filters 28–31 and operate as discussed hereinabove with respect to filters 26 and 27 with the units 21 and 22 operating as described hereinabove with respect to unit 20. The outputs from filters 26, 28 and 30 are then applied together with the reference signal $f_s$ to additional channel modulator, demodulator and frequency changer units 32–35 which incorporate the identical equipment as illustrated in unit 20 described hereinabove and in cooperation with the sideband passband filters 36–39 produce the FDM channel group of Curve A, FIG. 1 on the transmit path. The received FDM channel group is present on the received path and is passed through sideband passband filters 40–43 to units 32–35 for enabling the application of the output of these units to the filters 27, 29 and 31 whose output signal is the input signal to the balanced demodulator incorporated in units 20–22 to recover the audio output $f_1$.

One typical frequency translation plan for the transmit band of the arrangement of FIG. 2 is as follows:

CURVE A, FIG. 1 — Pregroup Modulation
Audio to pregroup:
$f_1 = 0.3–3.4$ KHz
$f_2 = 12, 16, 20, 24, 28, 32$ or 36 KHz
$f_3 = 12–16, 16–20, 20–24, 24–28, 28–32, 32–36, 36–40$ KHz, ie. the nominal 4 KHz upper sideband from $f_2+f_1$. Sideband $f_2-f_1$ is present but is subsequently filtered out by, for instance, sideband passband filter 26.

Pregroup to group:
$f_1' = 12–24, 24–36$ or 28–40 KHz, ie. combined upper sidebands of three adjacent $f_3$ signals above.
$f_2' = 84, 96, 100, 108, 112, 120, 124, 132, 136$ KHz.

$f_3' = 60-72, 72-84, 84-96, 96-108$ KHz, ie. the nominal lower sideband from $f_2-f_1$. Sideband $f_2+f_1$ is present but is subsequently filtered out by, for instance, sideband passband filter 36.

The frequency translation plans in the receive path are similar to the transmit path in that the carrier signal $f_2$ is the same for its associated demodulator as it is for the associated modulator in the different ones of the frequency channel units.

Referring to FIG. 3, there is illustrated therein the equipment in accordance with the principles of the present invention for carrying out the direct modulation scheme of Curve B, FIG. 1. In this modulation scheme the frequency channels are directly formed and are equal in number to twelve which would require twelve channel modulator, demodulator and frequency changer units 44-44n under control of reference signal $f_s$ provided by crystal control oscillator 49. Each of the units 44-44n include the equipment illustrated in unit 20, FIG. 2 which operates as described above.

As in the arrangement of FIG. 2, sideband passband filters 45-45n are provided in the transmit path to provide the desired single sideband output for transmission and sideband passband filters 46-46n are provided to pass the single sideband signal present on the receive path to the units 44-44n. The frequency translation plans for the transmit path of this arrangement are as follows:

CURVE B, FIG. 1 — Direct Modulation $f_1 = 0.3-3.4$ KHz
$f_2 = 64, 68, 72$ etc to 108 KHz
$f_3 = 60-64, 64-68, 68-72$ etc 104–108 KHz (nominal lower sideband)

The frequency translation plans in the receive path of the arrangement of FIG. 3 are similar to the transmit path in that the carrier signal $f_2$ is the same for the associated demodulator as it is for the associated modulator in the different ones of the frequency channel units Referring to FIG. 4, there is illustrated therein in block diagram form the equipment in accordance with the principles of the present invention to carry out the premodulation scheme of Curve C, FIG. 1. In this arrangement the channel modulator, demodulator and frequency changer unit 47 under control of the signal $f_s$ of crystal controlled oscillator 48. Unit 47 employs the same equipment and operates as described with respect to unit 20 of FIG. 2. Unit 47 produces the FDM premodulation channel of 48 KHz to 52 KHz as shown in Curve C, FIG. 1. The output from sideband passband filter 50 is then coupled to twelve identical units 51-51n employing the same equipment and operates as described with respect to unit 20 of FIG. 2. The output signals from units 51-51n are coupled through sideband passband filters 52-52n to the transmit path. Coupled to the receive path is sideband passband filters 53-53n which is operated upon by the demodulator of the units 51-51n and then coupled to sideband passband filter 54 to enable the demodulator of unit 47 to recover the audio signal present in the frequency channels received on the receive path.

The frequency translation plans for the transmit path are as follows:

CURVE C, FIG. 1 — Premodulation

Audio to premodulation:
$f_1 = 0.3-3.4$ KHz
$f_2 = 48$ KHz
$f_3 = 48-52$ KHz (nominal upper sideband)
Premodulation to group:
$f_1' = 48-52$ KHz
$f_2' = 112, 116, 120$ etc., to 156 KHz
$f_3' = 60-64, 64-68, 68-72$ etc., to 104–108 KHz, ie. the channel portion of the lower sideband plus the upper sidebands and carrier leaks. Note that unwanted components between 60 and 108 KHz from any modulator are not subsequently filtered out.

The frequency translation plans in the receive path are similar to the transmit in that carrier signal $f_2$ is the same for the associated demodulator as it is for the associated modulator in the different ones of the frequency channel units.

While I have described above the principles of my invention in connection with specific apparatus it is to be clearly understood that this description is made only by way of example and not as a limitation to the scope of my invention as set forth in the objects thereof and in the accompanying claims.

I claim:

1. In a frequency division multiplex (FDM) system, a plurality of FDM frequency channel units each comprising:

first means responsive to a single reference signal having a predetermined first frequency, said reference signal being coupled in common to all of said units to produce a carrier signal having a different predetermined second frequency in each of said units; and second means directly coupled to said first means and an audio input to modulate and to transmit an associated one of said carrier signals with audio information.

2. Channel units according to claim 1, wherein each of said first means includes a physically programmable voltage controlled oscillator to produce an associated one of said carrier signals for each of said units, and a phase locked loop coupled to said oscillator responsive to said reference signal to control said oscillator to maintain said associated one of carrier signals at said different predetermined second frequencies.

3. Channel units according to claim 2, wherein each of said second means includes
    a balanced modulator.

4. Channel units according to claim 1, wherein each of said second means includes
    a balanced modulator.

5. Channel units according to claim 1, wherein each of said first means includes
    a physically programmable counter responsive to said reference signal to produce an associated one of said carrier signals for each of said units.

6. Channel units according to claim 5, wherein each of said second means includes
    a balanced modulator.

7. Channel units according to claim 1, further including
    third means disposed in each of said units coupled to said first means responsive to an associated one of said carrier signals produced by said first means to demodulate an associated one of a plurality of received information bearing carrier signals.

8. Channel units according to claim 7, wherein each of said first means includes a physically programmable voltage controlled oscillator to produce an associated one of said carrier signals for each of said units, and a phase locked loop coupled to said oscillator responsive to said reference signal to control said oscillator to maintain said associated one of carrier signals at said different predetermined second frequencies.

9. Channel units according to claim 8, wherein each of said third means includes
a balanced demodulator.

10. Channel units according to claim 8, wherein each of said second means includes
a balance modulator.

11. Channel units according to claim 10, wherein each of said third means includes
a balanced demodulator.

12. Channel units according to claim 7, wherein each of said second means includes
a balanced modulator.

13. Channel units according to claim 7, wherein each of said third means includes
a balanced demodulator.

14. Channel units according to claim 7, wherein each of said first means includes
a physically programmable counter responsive to said reference signal to produce an associated one of said carrier signals for each of said units.

15. Channel units according to claim 14, wherein each of said second means includes
a balanced modulator.

16. In a frequency division multiplex (FDM) system, a plurality of FDM frequency channel units each comprising:

first means responsive to a single reference signal having a predetermined first frequency, said reference signal being coupled in common to all of said units to produce a carrier signal having a different predetermined second frequency in each of said units; and second means coupled to said first means to modulate and to transmit an associated one of said carrier signals with information a group of said units providing a FDM channel pregroup, and the remainder of said units being coupled to each of said units of said group of said units to provide a FDM channel group.

17. Channel units according to claim 16, further including third means disposed in each of said units coupled to said first means responsive to an associated one of said carrier signals produced by said first means to demodulate an associated information bearing channel of a received FDM channel group and an associated information bearing channel of a received FDM channel pregroup.

18. In a frequency division multiplex (FDM) system, a plurality of FDM frequency channel units each comprising:

first means responsive to a single reference signal having a predetermined first frequency, said reference signal being coupled in common to all of said units to produce a carrier signal having a different predetermined second frequency in each of said units; and second means coupled to said first means to modulate and to transmit an associated one of said carrier signals with information said units directly providing a FDM channel group.

19. Channel units according to claim 18, further including third means disposed in each of said units coupled to said first means responsive to an associated one of said carrier signals produced by said first means to demodulate an associated information bearing channel of a received FDM channel group.

20. In a frequency division multiplex (FDM) system, a plurality of FDM frequency channel units each comprising:

first means responsive to a single reference signal having a predetermined first frequency, said reference signal being coupled in common to all of said units to produce a carrier signal having a different predetermined second frequency in each of said units; and second means coupled to said first means to modulate and to transmit an associated one of said carrier signals with information.

one of said units providing a single FDM premodulation channel, and the remainder of said units being coupled to said one of said units to provide a FDM channel group.

21. Channel units according to claim 20, further including third means disposed in each of said units coupled to said first means responsive to an associated one of said carrier signals produced by said first means to demodulate an associated information bearing channel of a received FDM channel group and a single information bearing channel of a received FDM premodulation channel.

* * * * *